United States Patent [19]
Westmoreland

[11] Patent Number: 6,164,194
[45] Date of Patent: Dec. 26, 2000

[54] COOKING RACK WITH CENTER RELEASE

[76] Inventor: Ola Westmoreland, P.O. Box 733, Rio Linda, Calif. 95673

[21] Appl. No.: 09/440,671

[22] Filed: Nov. 16, 1999

Related U.S. Application Data

[60] Provisional application No. 60/120,136, Feb. 16, 1999.

[51] Int. Cl.[7] .............................. A23L 1/00; A47J 37/00; A47J 37/04; A47J 43/00; A47J 43/18
[52] U.S. Cl. ................................ 99/426; 99/449; 99/450; 211/181.1
[58] Field of Search ..................... 99/426, 427, 444–450, 99/394; 16/262; 126/9 R, 25 R; 211/181.1, 175, 49.1, 60.1; 248/166, 172; 294/1.1, 15, 152, 164, 169; D7/409

[56] References Cited

U.S. PATENT DOCUMENTS

| D. 321,804 | 11/1991 | Wolff et al. ............................... D7/404 |
| D. 368,186 | 3/1996 | Tiemann ............................. D6/566 X |
| D. 369,933 | 5/1996 | Tiemann ................................. D6/566 |
| 2,549,709 | 4/1951 | Potts . |
| 2,703,046 | 3/1955 | Ahlquist . |
| 3,075,798 | 1/1963 | Smith . |
| 3,084,617 | 4/1963 | Jamentz . |
| 4,171,151 | 10/1979 | Luck ...................................... 312/236 |
| 4,178,844 | 12/1979 | Ward et al. . |
| 4,191,160 | 3/1980 | Elliott ..................................... 126/9 R |
| 4,223,818 | 9/1980 | Johnson . |
| 4,432,334 | 2/1984 | Holt . |
| 4,458,585 | 7/1984 | Erbach ................................. 99/448 X |
| 4,481,874 | 11/1984 | Greck .................................... 211/181.1 |
| 4,633,773 | 1/1987 | Jay ............................................ 99/426 |
| 4,644,858 | 2/1987 | Liotto et al. . |
| 4,873,921 | 10/1989 | Piane, Sr. . |
| 5,103,799 | 4/1992 | Atanasio ................................ 126/9 R |
| 5,421,246 | 6/1995 | Tippmann et al. ....................... 99/426 |
| 5,558,237 | 9/1996 | Anconal .................................. 99/426 |
| 5,560,286 | 10/1996 | Fabrikant et al. ....................... 99/426 |
| 5,638,742 | 6/1997 | Kassaseya ............................. 99/449 X |

FOREIGN PATENT DOCUMENTS 270206    5/1927    United Kingdom .

Primary Examiner—Timothy Simone
Attorney, Agent, or Firm—Richard C. Litman

[57] ABSTRACT

A roaster rack for supporting meat or poultry for cooking. The rack comprises complementary halves releasably secured together to form a continuous support surface. Removal of a retaining pin from a hinge assembly permits the complementary halves to be separated, whereby the cooked food may be efficiently deposited on a platter or cutting board.

5 Claims, 4 Drawing Sheets 6,164,194

COOKING RACK WITH CENTER RELEASE

CROSS-REFERENCE TO RELATED APPLICATION

This application claims the benefit of U.S. Provisional patent application Ser. No. 60/120,136, filed Feb. 16, 1999.

BACKGROUND OF THE INVENTION

1. Field of the Invention

The present invention generally relates to cooking utensils. More specifically, the present invention is drawn to a roaster rack for supporting poultry or meat in an oven. The rack comprises complementary halves which are releasably joined together by a removable retaining pin.

2. Description of Related Art

Any person involved in the culinary arts knows the hazards involved when attempting to transfer a roast or a turkey from an oven roasting rack to a serving platter. Using forks or spatulas to make the transfer often results in messy "au jus" spills and/or dropped entrees. Having a utensil to make the transfer easy and efficient would certainly be a boon to the cook.

There are several devices currently available to facilitate the transfer of oven-cooked food to a serving dish. Exemplification of such devices are shown in U.S. Pat. Nos. 2,549,709 (Potts), 2,703,046 (Ahlquist), 3,075,798 (Smith), 3,084,617 (Jamentz), 4,178,844 (Ward et al.), and 4,432,334 (Holt) The above cited devices, however, do not employ a unique and efficient hinge system as presented in the instant invention.

U.S. Pat. No. 4,223,818 (Johnson) shows a wood carrier which can be separated into complementary parts.

U.S. Pat. Nos. 4,644,858 (Liotto et al.) and 4,873,921 (Piane, Sr.) respectively show a dual purpose baking pan and a multiple wok.

British Patent 270,206 discloses a casserole stand which can be separated into complementary parts.

None of the above inventions and patents, taken either singly or in combination, is seen to describe the instant invention as will be subsequently described and claimed.

SUMMARY OF THE INVENTION

The present invention is drawn to a roaster rack for supporting meat or poultry while the same is being cooked in an oven or the like. The rack is comprised of complementary halves which are assembled to form a support surface for the meat or poultry. A novel hinge and pin assembly permits the complementary halves, which form the rack, to be quickly disassembled so that the meat or poultry may be easily and efficiently transferred to a serving platter or carving board without the awkward use of forks and/or spatulas to lift the cooked food. The hinge assembly also permits the rack to be compactly folded for storage purposes.

Accordingly, it is a principal object of the invention to provide a roaster rack for supporting meats or poultry, which rack may be easily removed so that the food may be transferred to a serving platter or the like.

It is another object of the invention to provide a roaster rack for meats or poultry, which rack is constructed of complementary halves, releasably joined, to form a support surface.

It is a further object of the invention to provide a roaster rack for meats or poultry, which rack includes a unique hinge and release pin assembly that permits the rack to be folded for storage.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
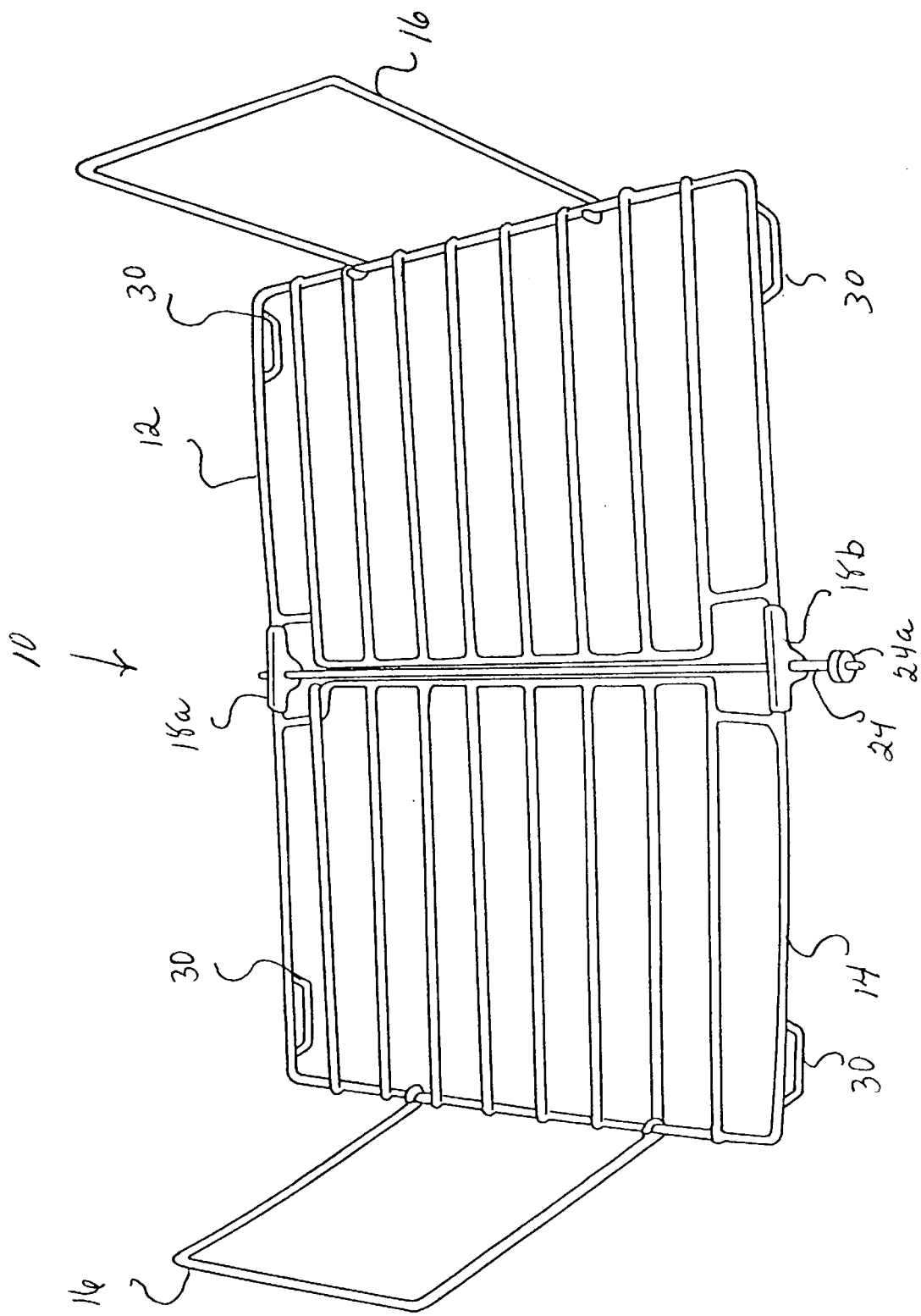
FIG. 1 is a perspective view of a cooking rack according to the present invention.

With reference to the drawings, the roaster rack of the present invention is indicated generally by the numeral 10 and consists of two grate-like support members 12 and 14. Although illustrated as planar rectangles, it is obvious that the members may assume other planar configurations. Members 12, 14 are adapted to be releasably assembled as will be explained below. U-shaped handles 16 are pivotally secured to respective outer ends of members 12 and 14. When assembled, rack 10 is approximately nine inches wide and fourteen inches long (excluding handles 16).

Figure 3:
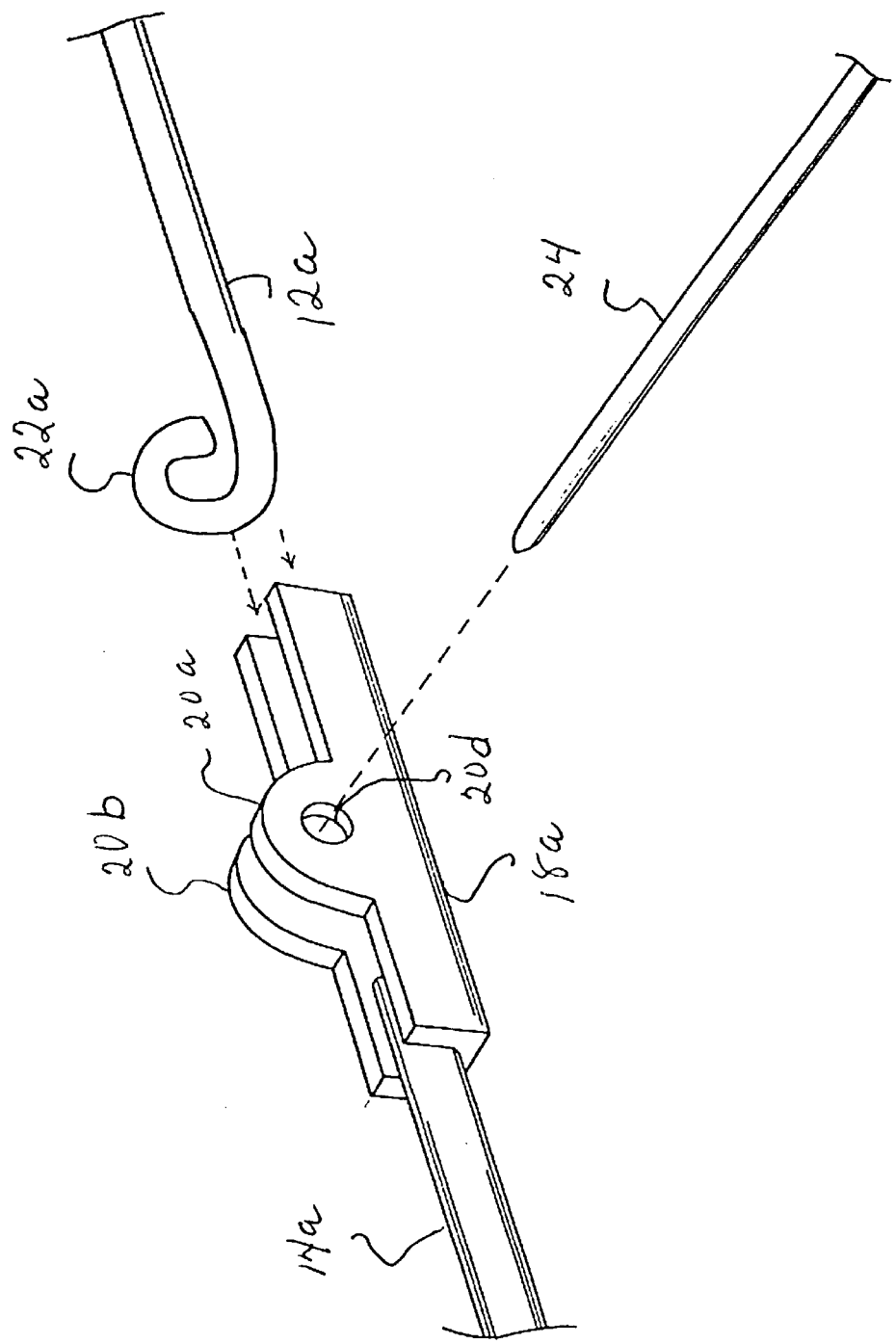
FIG. 3 is a bottom, perspective detail view illustrating the hinge assembly inverted, according to the present invention.

Hinge pieces 18a and 18b are attached at respective inner ends 14a, 14b of member 14. As best seen in FIG. 3, hinge piece 18a (inverted as shown) is designed as a trough-like member having spaced semi-circular ears 20a, 20b. Ears 20a, 20b extend downward from the underside of member 14. A coaxial hole 20d (only one is shown) is formed in each ear 20a and 20b. Hinge 18a is firmly attached to end 14a by welding or the like. Hinge 18b is identical to hinge 18a and is attached to end 14b in the same manner. Inner end 12a of member 12 is bent to form a loop 22a (FIG. 3). Inner end 12b is identically formed with a loop 22b.

When assembled, ends 12a, 12b are positioned into respective hinge pieces 18a, 18b so that loops 22a, 22b are aligned with the coaxial holes in hinge pieces 18a, 18b. Retaining pin 24 is inserted through the aligned holes whereby members 12 and 14 are joined together. Members 12 and 14 are formed with offset sections 26, 28 to provide for proper alignment of members 12 and 14 when assembled.

Support feet 30 are secured to the underside of members 12 and 14 adjacent the outer corners thereof. Support feet 30 extend downward the same distance as the ears 20a, 20b on hinges 18a, 18b so that the rack 10 is supported in a level plane.

Figure 2:
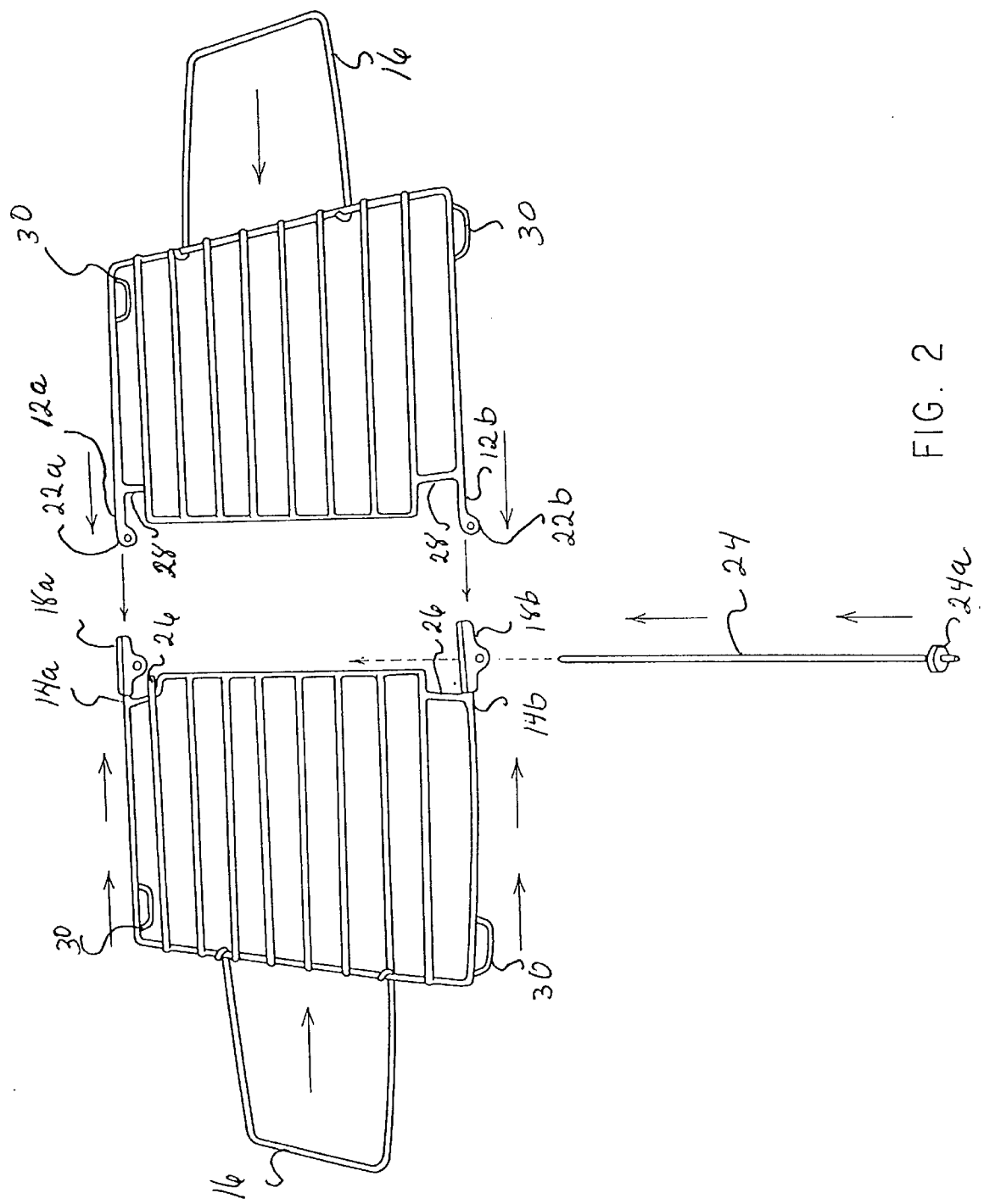
FIG. 2 is an exploded perspective view showing the halves of the rack separated after removal of the release pin according to the present invention.
Figure 4:
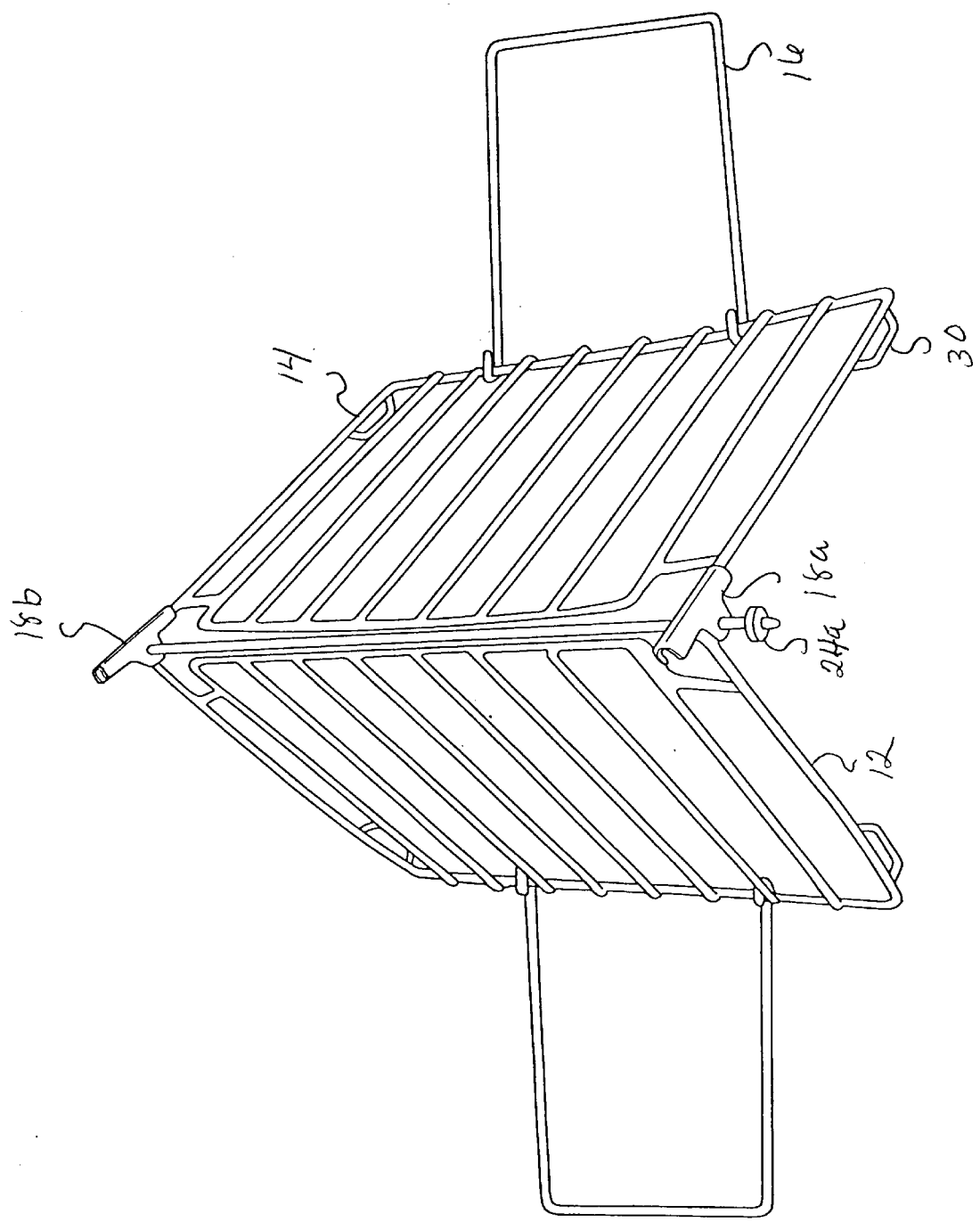
FIG. 4 is a perspective view showing the rack partially folded according to the present invention.

When assembled (FIG. 1), the rack 10 may support meat or poultry thereon and placed in a roasting pan (not shown) for cooking in an oven. When done, the rack may be lifted from the pan utilizing handles 16 and placed on a platter or the like. Removal of retaining pin 24 will permit members 12 and 14 to be separated (FIG. 2) whereby the cooked food is efficiently deposited on the platter without messy spills. A knob 24a is secured to the end of retaining pin 24 to facilitate pin withdrawal and insertion. After cleaning, the reassembled rack may be folded for storage if desired (FIG. 4).

It is to be understood that the present invention is not limited to the sole embodiment described above, but encompasses any and all embodiments within the scope of the following claims.

I claim:

1. A roaster rack adapted to support meat or poultry during the cooking thereof, said roaster rack comprising:

a flat, rectangular, grate-like first support member, said first support member having an inner end, an outer end, an upper surface and a lower surface;

a flat, rectangular, grate-like second support member, said second support member having an inner end, an outer end, an upper surface and a lower surface;

a U-shaped handle pivotally attached at the respective outer end of each said first support member and said second support member;

a pair of trough-shaped hinge members attached at the inner end of said first support member;

a pair of looped hinge members formed on the inner end of said second support member;

means for releasably connecting said pair of trough-shaped hinge members with said pair of looped hinge members whereby said first support member and said second support member are united to form a single support surface.

2. The roaster rack according to claim 1, wherein said trough-shaped hinge members each include spaced ear pieces, said ear pieces extending a first distance perpendicularly downward from said lower surface of said first support member, said ear pieces having coaxial bores formed therein.

3. The roaster rack according to claim 2, wherein said pair of looped hinge members are aligned with said coaxial bores and said means for releasably connecting is a retaining pin insertable through said looped hinge members and said coaxial bores.

4. The roaster rack according to claim 3, wherein a pair of support feet are attached to the lower surface of each said first support member and said second support member, said support feet extending a second distance perpendicularly downward from said lower surface of each said first support member and said second support member.

5. The roaster rack according to claim 4, wherein said first distance and said second distance are equal whereby said roaster rack is supported in a level plane.

\* \* \* \* \*